(12) United States Patent
Sun et al.

(10) Patent No.: US 11,718,549 B2
(45) Date of Patent: Aug. 8, 2023

(54) TREATMENT SYSTEM AND METHOD FOR DRINKING WATER

(71) Applicant: TSINGHUA UNIVERSITY, Beijing (CN)

(72) Inventors: Wenjun Sun, Guelph (CA); Jingdong Shi, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/799,951

(22) PCT Filed: Apr. 13, 2021

(86) PCT No.: PCT/IB2021/053053
§ 371 (c)(1),
(2) Date: Aug. 16, 2022

(87) PCT Pub. No.: WO2022/172070
PCT Pub. Date: Aug. 18, 2022

(65) Prior Publication Data
US 2023/0118796 A1 Apr. 20, 2023

(30) Foreign Application Priority Data
Feb. 10, 2021 (CN) .......................... 202110182570.7

(51) Int. Cl.
*C02F 9/00* (2023.01)
*C02F 1/00* (2023.01)
(Continued)

(52) U.S. Cl.
CPC ................ *C02F 9/00* (2013.01); *C02F 1/008* (2013.01); *C02F 1/283* (2013.01); *C02F 1/32* (2013.01); *C02F 1/444* (2013.01); *C02F 1/78* (2013.01); *C02F 1/004* (2013.01); *C02F 2201/32* (2013.01); *C02F 2201/782* (2013.01); *C02F 2209/003* (2013.01); *C02F 2209/005* (2013.01); *C02F 2209/02* (2013.01);
(Continued)

(58) Field of Classification Search
None
See application file for complete search history.

(56) References Cited

U.S. PATENT DOCUMENTS 6,685,825 B1   2/2004   Chang
8,486,275 B2   7/2013   Wolf
(Continued)

*Primary Examiner* — Richard C Gurtowski
(74) *Attorney, Agent, or Firm* — SZDC Law P.C.

(57) ABSTRACT

A water treatment system comprises a flow path through a first activated carbon filter, a second activated carbon filter downstream of the first activated carbon filter, a particulate filter downstream of the second activated carbon filter, for example a ceramic membrane, and a UV sterilizer downstream of the particulate filter. Ozone is introduced into the process water ahead of a water storage vessel for storing treated water produced by the system. A recycle subsystem is periodically operated to withdraw treated water from the water storage vessel to form recycled water, introduce the recycled water to the water lines upstream of the UV sterilizer, and return the recycled water to the water storage vessel. A main programmable logic controller (PLC) controls a flow of the process water through the water treatment system and controls the recycle subsystem.

16 Claims, 6 Drawing Sheets

(51) Int. Cl.
  *C02F 1/28*   (2023.01)
  *C02F 1/32*   (2023.01)
  *C02F 1/44*   (2023.01)
  *C02F 1/78*   (2023.01)

(52) U.S. Cl.
  CPC ...... *C02F 2209/03* (2013.01); *C02F 2209/05* (2013.01); *C02F 2209/06* (2013.01); *C02F 2209/10* (2013.01); *C02F 2209/23* (2013.01); *C02F 2209/29* (2013.01); *C02F 2209/36* (2013.01); *C02F 2209/40* (2013.01); *C02F 2209/42* (2013.01); *C02F 2301/046* (2013.01); *C02F 2301/08* (2013.01); *C02F 2303/18* (2013.01)

(56) References Cited

U.S. PATENT DOCUMENTS

| | | |
|---|---|---|
| 2005/0139530 A1 | 6/2005 | Heiss |
| 2005/0249631 A1 | 11/2005 | Schulz et al. |
| 2008/0314807 A1 | 12/2008 | Junghanns et al. |
| 2010/0006490 A1* | 1/2010 | Fukuyo ............... C02F 1/78 210/170.11 |
| 2019/0127253 A1 | 5/2019 | Thomas et al. |

* cited by examiner

TREATMENT SYSTEM AND METHOD FOR DRINKING WATER

This application is the National Stage Application of PCT/IB2021/053053, filed on Apr. 13, 2021, which claims priority to Chinese Patent Application No. 202110182570.7, filed on Feb. 10, 2021, which is incorporated by reference for all purposes as if fully set forth herein.

FIELD

This application relates to water treatment, in particular to a system and method for treating drinking water, preferably at the end of a municipal water supply network at the point of entry of the municipal water supply into a building.

BACKGROUND

Drinking water in a municipal water supply has generally undergone some form of treatment to disinfect the water obtained from the ultimate source. Depending on the efficiency of the disinfecting system and whether or not other treatment of the water has been performed at the municipal level, the drinking water in a municipal water supply may still have unacceptable taste and odor and may contain potentially unhealthy disinfection byproducts (DBP) as a result of the municipal disinfection process. For example, chlorine is a typical disinfectant used by municipalities, the byproducts of water chlorination including trihalomethanes (THMs) and other chlorinated compounds, which are implicated in causing cancer and other illnesses in humans.

To mitigate these potential problems with municipal water supplies, buildings may be equipped with point of entry water treatment systems for deep treatment of the municipally supplied water to improve taste, reduce odor and remove undesirable disinfection byproducts as the municipal water enters the building's water supply system. A point of entry treatment system generally utilizes one of two approaches: ozonation in conjunction with biological activated carbon; or, membrane separation.

Currently, the use of ozonation in conjunction with biological activated carbon technology for treating drinking water provides good results, and most point of entry water treatment systems utilize this technology. In an ozone biological activated carbon process, ozone oxidation of the water is carried out first, followed by passing the water through a biological activated carbon layer. Organic compounds and other substances in the water are adsorbed on to the surface of the activated carbon where microorganisms living in a biofilm on the surface of the activated carbon further treat the organic compounds and other substances. However, adsorption by activated carbon generally disappears after two months of usage, therefore the activated carbon needs to be replaced often. Further, backwashing of the activated carbon and biological leakage may result in reintroducing organic compounds and other substances and introducing microorganisms into the drinking water supply.

Membrane separation technology utilizes mechanical filtration, usually driven by pressure, to separate impurities from the water. Membrane separation includes microfiltration (MF), ultrafiltration (UF), nanofiltration (NF) and reverse osmosis (RO). However, membrane filtration is a secondary pollution source with water utilization rate being low, the lowest single-level recovery rate being only 15%. Further, human health is adversely affected by drinking pure water for a long time.

At present, there is no comprehensive and effective point of entry treatment system for drinking water, which overcomes the problems of existing technologies in respect of water resource waste and adverse health effects.

SUMMARY

A water treatment system comprises a system inlet in fluid communication with a source of water to be treated and admitting process water to the water treatment system, the system inlet in fluid communication with a plurality of water lines for transporting the process water through the system along a flow path where the process water flows through a first activated carbon filter, a second activated carbon filter downstream of the first activated carbon filter, a particulate filter downstream of the second activated carbon filter, and a UV sterilizer downstream of the particulate filter; an ozone subsystem comprising an ozonator for making ozone and at least one junction along the flow path for introducing the ozone into the process water; a water storage vessel at an end of the flow path for storing treated water produced by the system; a system outlet in fluid communication with the water storage vessel for delivering the treated water to a location outside the water treatment system; a recycle subsystem that is periodically operated to withdraw treated water from the water storage vessel to form recycled water, introduce the recycled water to the water lines upstream of the UV sterilizer, and return the recycled water to the water storage vessel; and, a main programmable logic controller (PLC) for controlling a flow of the process water through the water treatment system and for controlling the recycle subsystem.

In some embodiments, the ozone subsystem withdraws treated water from the water storage vessel and adds ozone to the treated water to form ozonated water. The ozone subsystem may introduce the ozonated water to the process water through a first branch water line connected to the flow path at a first junction located between the second activated carbon filter and the UV sterilizer, through a second branch water line connected to the flow path at a second junction located between the first activated carbon filter and the second activated carbon filter, and through a third branch water line connected to the flow path at a third junction located upstream of the first activated carbon filter. The ozone subsystem may comprise a first eductor in the first branch water line, a second eductor in the second branch water line, and a third eductor in the third branch water line and the first eductor, the second eductor and the third eductor may introduce the ozone to the treated water to form the ozonated water in the first branch water line, the second branch water line and the third branch water line. The ozone subsystem may further comprises a first UV oxidizer in the first branch water line downstream of the first eductor, a second UV oxidizer in the second branch water line downstream of the second eductor, and a third UV oxidizer in the third branch water line downstream of the third eductor. The amount of ozone in the process water may be in the range of from 0.05 to 2 ppm.

In some embodiments, the water treatment system comprises a water quality analyzer for measuring at least one water quality parameter of the process water, the water quality analyzer in electronic communication with the main programmable logic controller, the main programmable logic controller programmed to compare the at least one water quality parameter measured by the at least one sensor to an index value of the at least one water quality parameter and to operate the water treatment system based on the comparison. The at least one water quality parameter may comprise one or more of residual chlorine, total chlorine, total organic carbon, total dissolved solids, pH, conductivity and temperature. The at least one water quality parameter may comprise a plurality of water quality parameters. The main programmable logic controller may comprise, or is in communication with, an ozone controller that controls an amount of ozone injected into the process water based on the comparison. The system may comprise an in-line ozone detector that measures an ozone concentration and the ozone controller may control an amount of ozone introduced into the process water based on the ozone concentration. The ozone concentration may be measured in the treated water and/or the process water being treated.

In some embodiments, the recycle subsystem is automatically operated on a periodic time basis. The recycle subsystem may be operated once every 12 to 16 hours. The recycle subsystem may be operated for a cycle time of from 15 to 30 minutes. The UV sterilizer may also be operated when the recycle subsystem is operated.

In some embodiments, the water storage vessel is a variable-volume water storage vessel comprising at least one water level sensor that signals a shutdown of a flow of the process water into the system when water level in the vessel is at or exceeds a first predetermined water level and signals a switch on of the flow of process water into the system when the water level in the vessel is at or lower than a second predetermined water level lower than the first predetermined water level. The system may further comprise a water holding tank between the system inlet and the first activated carbon filter, and the water holding tank may be a variable-volume water storage vessel comprising at least one water level sensor that signals a shutdown of a flow of the process water into the system when water level in the vessel is at or exceeds a first predetermined water level and signals a switch on of the flow of the process water into the system when the water level in the vessel is at or lower than a second predetermined water level lower than the first predetermined water level.

In some embodiments, the second activated carbon filter may contain bamboo-derived activated carbon, coconut-derived activated carbon, or both bamboo-derived activated carbon and coconut-derived activated carbon. Additional materials may also be provided in the second activated carbon filter, such as zeolites or water softening resins, to perform additional water treatment steps, for example the removal of inorganic ions.

The use of a variable-volume water storage vessel for treated (i.e. decontaminated) water in a water treatment system permits efficient and effective water recycling modalities in combination with efficient use of one or more water treatment devices in the system. Coupled with monitoring certain water quality parameters and controlling water treatment and recycling parameters, the water treatment system ensures the delivery of very clean water on demand over extended periods of time without the need for as much replacement and/or regeneration of the water treatment devices. The water treatment system is particularly effective in reducing the amount of disinfection by-products (DBP's) in the treated water.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
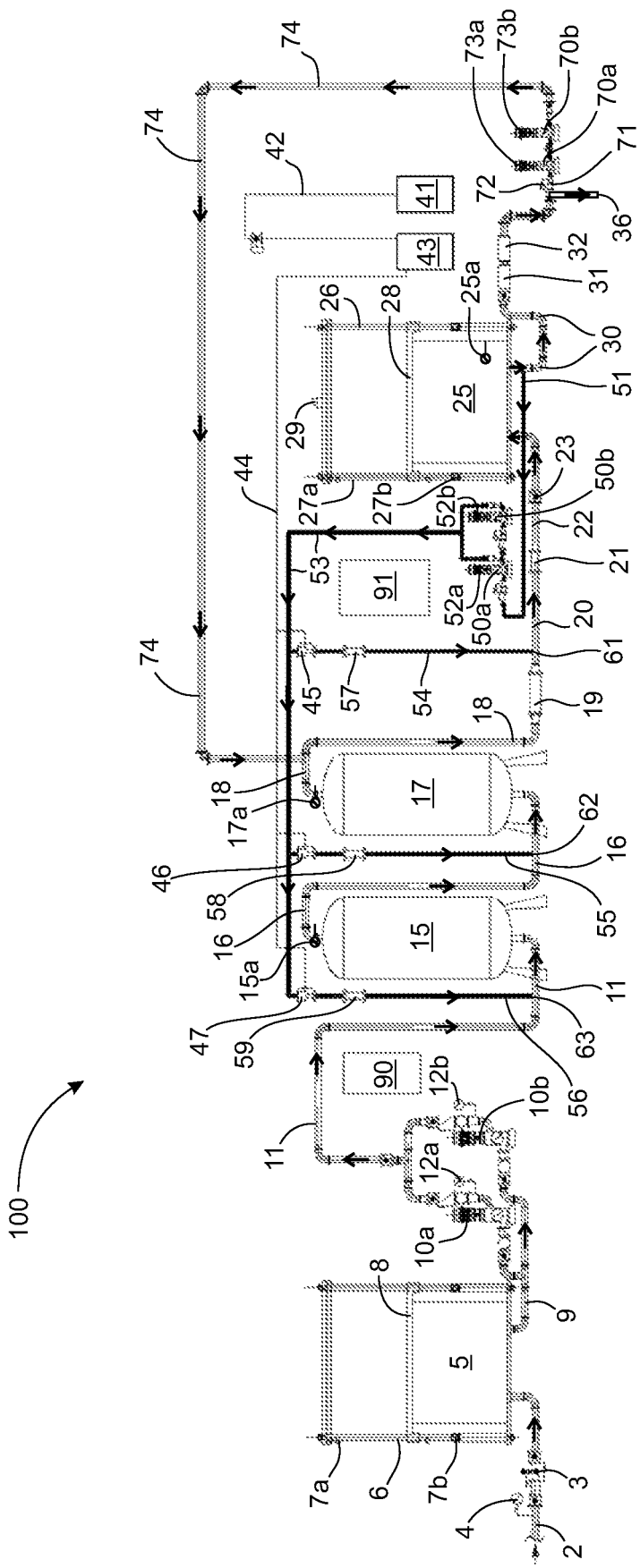
FIG. 1 is a schematic diagram of a water treatment system.

With reference to FIG. 1, one embodiment of a point of entry water treatment system 100 is schematically illustrated. The water treatment system 100 is particularly suitable for treating water from a municipal water supply (not shown) to provide drinking water for a water distribution system (not shown) of a building. The water treatment system 100 comprises a water pipeline, comprising a plurality of water lines, which is shown in FIG. 1 with open-headed arrows to show direction of water flow in the pipeline. The pipeline comprises a system inlet 2 that permits process water from the municipal water supply to enter into the water treatment system 100 to be treated, and a system outlet 36 that permits decontaminated process water to exit the water treatment system 100 as drinking water into the water distribution system of the building.

The system inlet 2 is equipped with an inlet valve 3, which can be opened and closed to permit or prevent flow of the process water into the system 100. A pressure sensor 4 (or flow meter if desired) can be used to monitor water flowing through the inlet 2. After entering through the inlet 2, the process water enters a water-tight variable-volume inlet water holding tank 5, which is enclosed in an enclosure 6. An upper limit switch 7a and a lower limit switch 7b located on a sidewall of the enclosure 6 are tripped when a top plate 8 of the holding tank 5 encounters the switches 7a, 7b during filling and emptying, respectively, of the holding tank 5. The upper limit switch 7a prevents overfilling of the holding tank 5 by turning off the flow of process water into the system 100 when the top plate 8 ascends to the upper limit switch 7a due to expansion of the holding tank 5, while the lower limit switch 7b prevents complete emptying of the holding tank 5 by turning on the flow of process water into the system 100 when the top plate 8 descends to the lower limit switch 7b due to contraction of the holding tank 5. From the holding tank 5, the process water flows into a water line 9, where the water flow is split between a primary water pump 10a and a standby water pump 10b. Under normal circumstances, the primary water pump 10a operates to pump the process water through the system 100. In case of failure of the primary water pump 10a, the process water can instead be pumped through the system 100 by the standby water pump 10b. When greater water flow is desired, both the primary water pump 10a and the standby water pump 10b may be operated at the same time. The water pumps 10a, 10b preferably provide a constant water pressure of about 2-10 kg/cm$^2$, preferably about 6 kg/cm$^2$ and a water flow in the range of 10-50 L/min, preferably about 35 L/min. The flow of the process water from the water pumps 10a, 10b is joined into a single water line 11 at a point situated downstream of the water pumps 10a, 10b. The limit switches 7a, 7b as well as the pressure sensor 4, and pressure sensors 12a, 12b associated with the water pumps 10a, 10b, are in electronic communication with a main programmed logic controller (PLC) 90, which is programmed to control the inlet valve 3, the water pumps 10a, 10b or both the inlet valve 3 and the water pumps 10a, 10b to stop or permit flow of process water into the system 100. The system 100 may comprise a backup programmed logic controller (PLC), which has the same functionality as the main PLC 90 in the event that the main PLC 90 fails.

From the water line 11, the process water enters a first activated carbon filter 15 and flows through the first activated carbon filter 15 to exit into water line 16. Although in the embodiment shown the water flows upward through the first activated carbon filter 15 and exits into water line 16 through a top of the first activated carbon filter 15, persons of skill in the art will understand that alternative flow configurations are possible. The process water flows through the water line 16 to enter a second activated carbon filter 17 and flows through the second activated carbon filter 17 to exit into water line 18. The activated carbon filters 15, 17 may be equipped with pressure sensors in electronic communication with the PLC 90 to assist with control over water flow and pressure in the system 100. Any suitable activated carbon may be used in the activated carbon filters 15, 17; however, it has been found that a bamboo-derived activated carbon is particularly effective for at least partially decontaminating the process water. Further, coconut-derived activated carbon has been found to improve the taste of the water; therefore, the second activated carbon filter 17 preferably comprises bamboo-derived activated carbon, coconut-derived activated carbon, or a combination thereof.

From water line 18, the process water flows through a particulate filter 19 into water line 20. The particulate filter 19 preferably comprises a ceramic membrane that may be either a microfiltration membrane with a pore size in the range of 0.1-10 microns, preferably about 5 microns, or an ultrafiltration membrane with a pore size in the range of 0.01-0.1 microns, preferably about 0.05 microns. The activated carbon filters 15, 17 remove contaminants from the process water by an adsorption mechanism, while the particulate filter 19 removes contaminants from the process water by a size exclusion mechanism. The particulate filter 19 is particularly effective in removing fine carbon particles from the water that are washed off of the activated carbon filters 15, 17.

From the water line 20, the process water flows through a first ultraviolet (UV) sterilizer 21 into water line 22. The first UV sterilizer 21 sterilizes bacteria and other organisms in the process water by delivering a germicidal UV dose in the range of 5-40 mJ/cm$^2$. The rate of process water flow through the filters 15, 17, 19 and through the first UV sterilizer 21 may be controlled by the PLC 90 to optimize residence time of the process water in those devices. The residence time may be adjusted based on measured water parameters upstream of the system 100 or at various points within the system 100. The first UV sterilizer 21 may comprise any suitable UV lamp, for example a low-pressure or low-pressure amalgam mercury arc lamp sized to deliver the aforementioned UV dose to a maximum process water flow rate of about 60 liters per minute (LPM). The sequential use of a plurality of water treatment devices, including a plurality of different types of water treatment devices provides more effective decontamination of the process water.

From the water line 22, the process water flows into a water-tight variable-volume water storage vessel 25 for storing decontaminated process water. A valve 23 between the first UV sterilizer 21 and the water storage vessel 25 can be used to prevent flow of the process water out of the water storage vessel 25 when repairing or replacing the water storage vessel 25, the first UV sterilizer 21, the particulate filter 19, the first or second activated carbon filters 15, 17, the pumps 10a, 10b, the variable volume holding tank 5, or any of the water lines or other equipment preceding the water storage vessel 25. Although it is shown that the process water flows into the water storage vessel 25 through a bottom of the water storage vessel 25, other flow configurations are possible.

Figure 2:
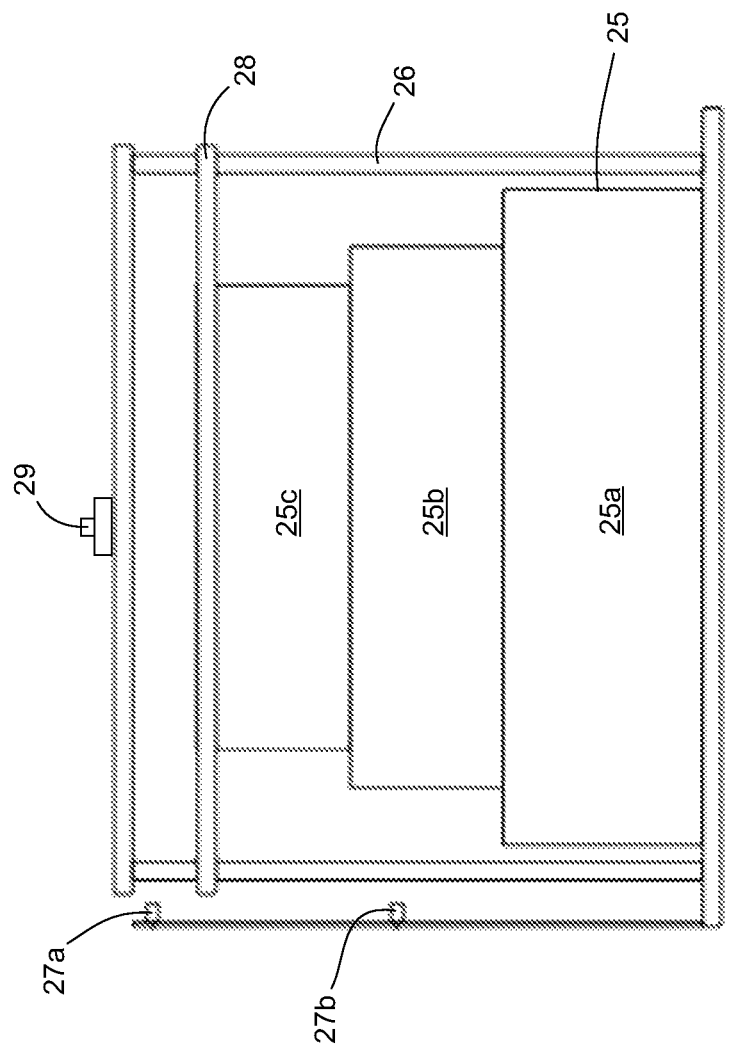
FIG. 2 is a schematic diagram of a variable-volume water storage vessel of the water treatment system of FIG. 1.

The variable-volume water storage vessel 25 is of similar design to the inlet water holding tank 5. As seen in FIG. 2, the water storage vessel 25 is enclosed in an enclosure 26. An upper travel switch 27a and a lower travel switch 27b located at a sidewall of the enclosure 26 are tripped when an edge of top plate 28 of the water storage vessel 25 encounters the switches 27a, 27b during filling and emptying, respectively, of the water storage vessel 25. The upper travel switch 27a prevents overfilling of the water storage vessel 25 by turning off the flow of process water into the system 100 when the top plate 28 ascends to the upper travel switch 27a due to expansion of the water storage vessel 25, while the lower travel switch 27b prevents complete emptying of the water storage vessel 25 by turning on the flow of process water into the system 100 when the top plate 28 descends to the lower travel switch 27b due to contraction of the water storage vessel 25. The water storage vessel 25 is a closed, water-tight collapsible/expandable accordion-like or telescoping container. The water storage vessel 25 may be composed of a flexible but puncture-resistant material, or a non-flexible material where successive portions 25a, 25b, 25c of the vessel 25 are nested to form a telescoping but water-tight container. The upper travel switch 27a and the lower travel switch 27b are also in electronic communication with the main programmed logic controller (PLC) 90. Additionally, the enclosure 26 is equipped with a vent valve 29 to permit air to enter or escape the enclosure 26, due to expansion or contraction of the water storage vessel 25. Additionally, weight may be placed on top of the top plate 28 to sustain or provide more pressure in the water storage vessel 25.

The decontaminated process water in the water storage vessel 25 flows out through the bottom of the water storage vessel 25 into water line 30 and passes through an in-line water quality analyzer 31 comprising an in-line ozone detector. Before flowing out of the system 100 through the system outlet 36, the water passes through a second UV sterilizer 32, which is similar to the first UV sterilizer 21, but may be sized differently to accommodate different flow rates. Water flows out through the system outlet 36 when there is a user demand for drinking water, such as in a building serviced by the water treatment system 100, that is initiated, for example, by opening a faucet. The in-line water quality analyzer 31 is preferably a multi-parameter water quality analyzer that monitors in real-time at least residual chlorine, total chlorine, pH, conductivity, temperature and optionally total organic carbon and total dissolved solids, although any one or more water quality parameters can be monitored. Instead of or in addition to the in-line ozone detector of the water quality analyzer 31, ozone levels can be monitored periodically by a technician taking samples manually. The in-line multi-parameter water quality analyzer 31 is in electronic communication with the main programmed logic controller (PLC) 90. Data from the in-line multi-parameter water quality analyzer 31 is used to control operation of the pumps 10a, 10b and water pumps in a recycle subsystem, described in greater detail below, to ensure that process water can be circulated in the system 100 for appropriate decontamination.

An ozone subsystem comprises an oxygen source 41 in fluid communication with an ozone generator 43 through gas line 42. The ozone generator 43 produces ozone from the oxygen, for example by a dielectric barrier discharge method. Alternatively, the ozone could be generated by an electrolytic ozone generator that directly decomposes some of the process water to generate ozone. The ozone is transported from the ozone generator 43 through gas line 44, and the ozone in the gas line 44 is injected into the system's water pipeline by eductors 45, 46, 47 at three different locations in an ozone delivery circuit of the system 100. The ozone delivery circuit is part of the ozone subsystem, which is controlled by an ozonation controller 91 that comprises suitable electronic control means, such as programmed logic controllers (PLC's). The ozonation controller 91 may be part of the main PLC 90 or in communication with the main PLC 90, so that the overall water flow and quality can be optimized according to pre-set treatment parameters. The ozone delivery circuit comprises water line 51 branching from the water line 30 that comes out of the bottom of the water storage vessel 25. Decontaminated process water from the water storage vessel 25 flows through the water line 51 to be split between a primary ozone dosing pump 52a and a standby ozone dosing pump 52b. Under normal circumstances, the primary ozone dosing pump 52a operates to pump the decontaminated process water from the water storage vessel 25 through the ozone delivery circuit. In case of failure of the primary ozone dosing 52a, the decontaminated process water can instead be pumped by the standby ozone dosing pump 52b. The primary ozone dosing pump 52a is equipped with a pressure sensor 50a, and the standby ozone dosing pump 52b is equipped with a pressure sensor 50b, which provide signals to the ozonation controller 91 for use in controlling operation of the dosing pumps 52a, 52b. The water pressure in the ozone delivery circuit is maintained at a pressure about twice the pressure in the remainder of the pipeline, for example a constant water pressure of about 12 $kg/cm^2$; however, the water flow ratio between the remainder of the pipeline and the ozone delivery circuit is maintained at a high ratio, for example 10:1, so that the ozone delivery circuit has little or no effect on the water pressure in the remainder of the pipeline.

Decontaminated process water flows from the ozone dosing pumps 52a, 52b into water line 53, which transports the decontaminated process water to three branch water lines 54, 55, 56. The first eductor 45 injects ozone into the water in the first branch water line 54. The second eductor 46 injects ozone into the water in the second branch water line 55. The third eductor 47 injects ozone into the water in the third branch water line 56. The eductors 45, 46, 47 inject ozone in the form of nano-sized bubbles that are well distributed in the water. The dose of ozone is in a range of 0.05-2.0 ppm, preferably 0.05-0.5 ppm. Ozone concentration in the pipeline may be controlled by adjusting the ozone generator 43 and/or by adjusting the eductors 45, 46, 47. Ozone control is performed automatically by the ozonation controller 91, which adjusts ozone concentration in response to water quality and ozone concentration information collected by the in-line multi-parameter water quality analyzer 31. The water in each of the branch water lines 54, 55, 56 passes through first UV oxidizer 57, second UV oxidizer 58, and third UV oxidizer 59, respectively, for additional decontamination and to promote conversion and utilization of the ozone through advanced oxidation processes (AOP's). AOP's are known to convert ozone into activated oxygen species that are highly reactive with organic matter and are useful in removing chemical contaminants from the water, as well as bacteria, viruses and other microbes. The UV oxidizers 57, 58, 59 are sized to deliver a UV dose of from 5-40 $mJ/cm^2$ over a range of water flow rates of from 1-50 LPM and preferably comprise UV LED's.

The first branch water line 54 connects to the water line 20 at first junction 61 so that ozonated water in the first branch water line 54 flows into the process water between the second activated carbon filter 17 and the water storage vessel 25. The first branch water line 54 is therefore responsible for adding ozone to the decontaminated process water in the water storage vessel 25. The second branch water line 55 connects to the water line 16 at second junction 62 so that ozonated water in the second branch water line 55 flows into the process water between the first activated carbon filter 15 and the second activated carbon filter 17. The second branch water line 55 is therefore responsible for adding ozone to the second activated carbon filter 17. The third branch water line 56 connects to the water line 11 at third junction 63 so that ozonated water in the third branch water line 56 flows into the process water before the first activated carbon filter 15. The third branch water line 56 is therefore responsible for adding ozone to the first activated carbon filter 15.

The recycle subsystem may be used while making treated water and/or during low water usage periods, such as at night, to ensure continuous decontamination of the process water even when there is little or no demand on the system 100. The recycle subsystem comprises a water line 71 that branches from the water line 30 after the in-line multi-parameter water quality analyzer 31, which comprises an in-line ozone detector. A valve 72 in the water line 71 can be closed when the recycle subsystem is not needed or is undergoing maintenance. Decontaminated process water from the water storage vessel 25 is pumped through the water line 71 by a primary recycle water pump 73a. In the event of a malfunction of the primary recycle water pump 73a, a secondary recycle water pump 73b is used to pump the decontaminated process water from the water storage vessel 25. Both the primary recycle water pump 73a and the secondary recycle water pump 73b can be used simultaneously if more recycle water flow is desired. The primary recycle water pump 73a and the secondary recycle water pump 73b can be equipped with pressure sensors 70a, 70b, respectively, in electronic communication with the PLC 90 to control the pressure and flow rate automatically in accordance with programming in the PLC 90. Recycle water in the water line 71 is pumped into a primary recycle water line 74, which joins to the water line 20 after the second activated carbon filter 17. The recycle water joins with the process water before passing through the particulate filter 19, then flows past the junction 61, where the process water is ozonated, and through the first UV sterilizer 21. Thus, the recycle water is treated by filtration, ozonation and UV sterilization before returning to the water storage vessel 25.

Periodic recycle intervals and cycle time are chosen depending on desired water quality to be maintained. Cycle intervals of 12-16 hours are preferred during periods of little or no water use. Cycle duration times of 15-30 minutes are used. Normal water pressure in the system 100 is maintained between upper and lower limits. If the pressure in the system 100 falls outside the limits due to operation of the recycle subsystem, an alarm may be triggered and the recycle subsystem switched off until the problem is rectified.

The recycle subsystem can be operated based on water quality parameters measured by the water quality analyzer 31. If any one or more of the water quality parameters is outside a predetermined range, the PLC 90 can automatically operate the recycle subsystem to improve water quality of the decontaminated process water leaving the system outlet 36.

The water treatment system 100 may comprise various other subsystems and/or valves. Valves located at various places in the pipeline can be operated to isolate all or parts of the water treatment system 100 from the municipal water supply and the water distribution system of the building in order to perform maintenance on or replacement of the entire water treatment system 100, or parts thereof. Furthermore, the water treatment system 100 may comprise a residual ozone collection and processing subsystem (not shown) in gaseous communication with the activated carbon filters 15, 17, the water storage vessel 25 and the recycle pumps 73a, 73b to prevent ozone leakage into the atmosphere.

Figure 3:
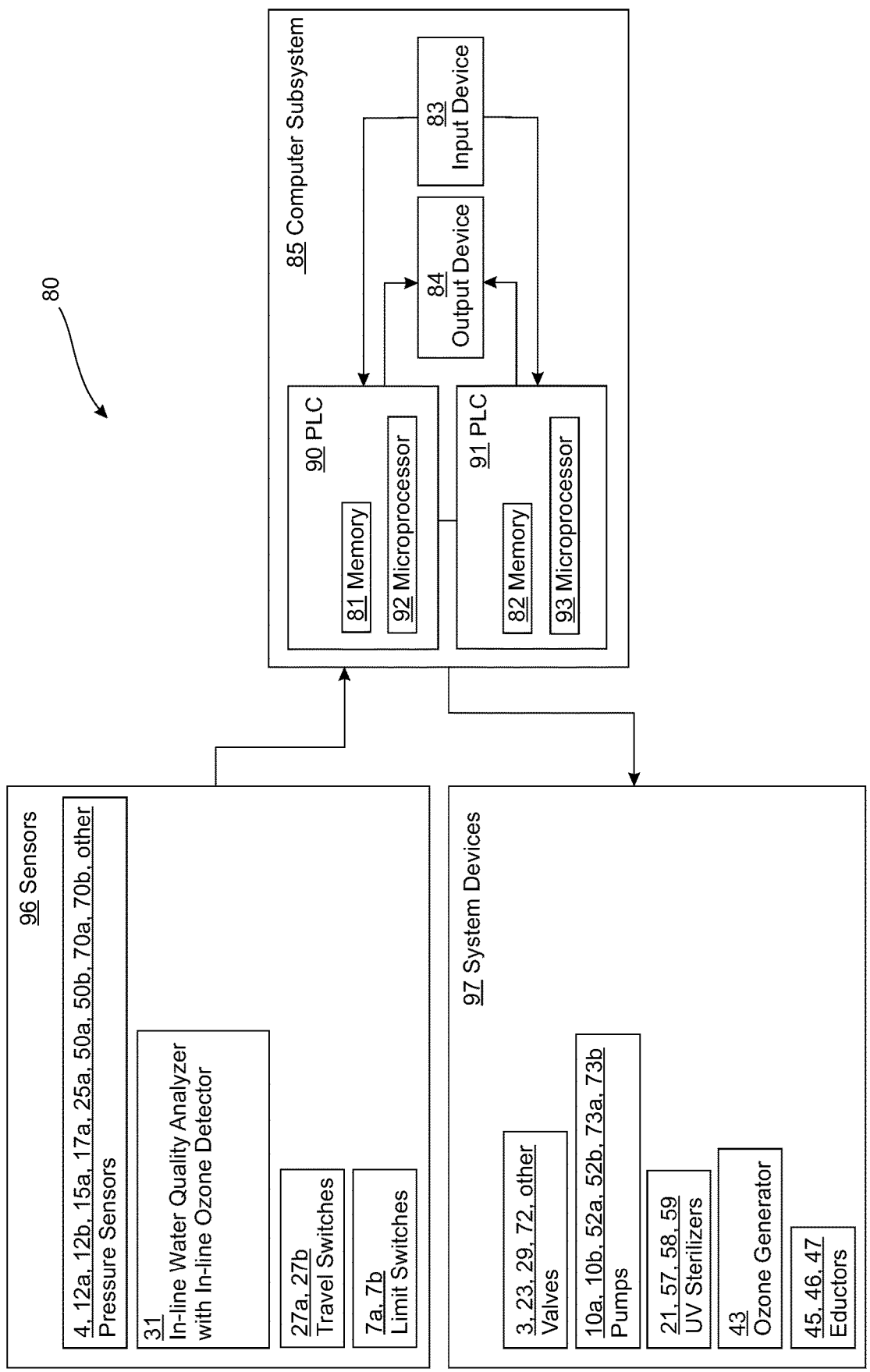
FIG. 3 is a schematic diagram of a control subsystem for the water treatment system of FIG. 1

Referring to FIG. 3, a control subsystem 80 of the water treatment system 100 comprises a computer subsystem 85 comprising the main controller (PLC) 90, the ozonation controller (PLC) 91, an input device 83 and an output device 84. The main controller 90 comprises a main microprocessor 92 and a main computer memory 81, and the ozonation controller 91 comprising an ozonation microprocessor 93 and an ozonation computer memory 82. The computer memories 81, 82 are in electronic communication with respective microprocessors 92, 93 and comprise non-transient electronic storage media for storing data collected by the various sensors, and/or for storing computer executable code for carrying out instructions for implementing the method. The computer memories 81, 82 may further comprise transient memories (e.g. random access memories (RAM)) accessible to the microprocessors 92, 93 while executing the code. The input device 83 and the output device 84 are in electronic communication with the controllers 90, 91, and may be local or remote with respect to the controllers 90, 91. The output device 84 may be a monitor, a printer, a device that interfaces with a remote output device or the like. The input device 83 may be a keyboard, a mouse, a microphone, a device that interfaces with a remote input device or the like. The controllers 90, 91 are also in electronic communication with the various sensors 96 and the various system devices 97. Electronic communication may be hardwired or wireless. Electronic communication can be dedicated or through internet connections.

The main controller 90 and the ozonation controller 91 are programmed to automatically control various system parameters in response to data received from the various sensors. The following description of control features refers to the main controller 90, but could equally apply to the ozonation controller 91.

Ozone Production

In the electrolytic ozone system, a dielectric barrier discharge ozone generator 43 is used to produce the ozone from oxygen gas. The gas source 41 is medical grade pure oxygen (>99.5% $O_2$). In the ozone generator 43, when oxygen flows through a gap between two plates to which a high-voltage electric field is applied, the high-voltage electric field causes a corona reaction of the oxygen, and the oxygen molecules are ionized into two oxygen atoms through the reaction. The ionized oxygen atoms are then reacted with other oxygen to form ozone ($O_3$). The ozone is added to the process water using nano-microbubble technology involving water eductors 45, 46, 47. There are two ways to control the ozone concentration. One is to adjust the ozone concentration by adjusting the ozone generator 43, and the other is to control the intake air volume by controlling the flow velocity of the eductor water flow, thereby adjusting the ozone concentration. The ozone generator 43 and the eductors 45, 46, 47 are operatively connected to the ozonation controller 91. Based on data collected by the in-line ozone detector of the water quality analyzer 31, any one of or a combination of the ozone generator 43 and the eductors 45, 46, 47 are adjusted by the ozonation controller 91 to maintain ozone concentration in the decontaminated process water in a desired range.

Automatic Start and Stop

The water storage vessel 25 adopts a retractable closed structure. The top plate 28 of the water storage vessel 25 can be moved up and down with the water level to maintain tightness of the container. Two travel switches 27a, 27b are installed on a side of the enclosure 26, one near the top and one near the middle of the water storage vessel 25. As the top plate 28 drops with lowering water level to the position of the middle travel switch 27b, the travel switch 27b is triggered and sends a signal to the main PLC 90. The main PLC 90 then controls the water pumps 10a, 10b to start, thereby automatically replenishing the water in the system 100. When the water level gradually rises and the top plate 28 reaches the position of the top travel switch 27a, the travel switch 27b is triggered and sends a signal to the main PLC 90. The main PLC 90 then controls the water pumps 10a, 10b to stop. The inlet water holding tank 5 has a similar arrangement.

Automatic Circulation and Decontamination

The system 100 comprises a multi-parameter water quality analyzer 31, which measures water quality parameters such as residual chlorine, total chlorine, total organic carbon, total dissolved solids, pH, conductivity, and temperature. Each water quality parameter is assigned a limit value representing a limit over which the quality of the water has become undesirably poor. When the measured value of one of the water quality parameters exceeds the limit, the main PLC 90 automatically starts the recycle subsystem by switching on at least one of the recycle pumps 73a, 73b and opening any necessary valves. With the recycle system switched on, the ozonation controller 91 will automatically adjust the water flow of the eductors 45, 46, 47 according to the water quality data obtained from the main PLC 90 to adjust the 03 concentration to meet process design requirements and achieve energy saving. The first step is to adjust the ozone output concentration of the ozone generator 43, and the second is to adjust and control solenoid valves connected in series with the water eductors 45, 46, 47. If after running the recycle subsystem, the measured value of the water quality parameters still exceeds the limit, the main PLC 90 stops the water pumps 10a, 10b and issues an alert. The fault is displayed on the output device 84 in electronic communication with the main PLC 90.

Faults and Alarms

Water pressure sensors in electronic communication with the main PLC 90 are installed on at least the water pumps 10a, 10b, the activated carbon filters 15, 17, and water storage vessel 25. Thus, the water pumps 10a, 10b are equipped with the pressure sensors 12a, 12b, respectively, the first activated carbon filter 15 is equipped with pressure sensor 15a, the second activated carbon filter 17 is equipped with pressure sensor 17a, and the water storage vessel 25 is equipped with pressure sensor 25a. The normal operating pressure range of the system 100 is a set range with an upper and lower limit. When a pressure sensor is lower than the lower limit or higher than the upper limit, the main PLC 90 stops the water pumps 10a, 10b and issues an alert. The fault is displayed on the output device 84 in electronic communication with the main PLC 90.

Ozone Control Priority

The travel switches 27a, 27b of the water storage vessel 25 are a first-level control over the addition of ozone to the process water in the pipeline. Automatic control of the recycle subsystem is a second-level control over the addition of ozone to the process water in the pipeline. Periodic recycle intervals od he recycle subsystem is a third-level control over the addition of ozone to the process water in the pipeline. When control events overlap, the main PLC 90 prioritizes the first-level control over the second-level control and third-level control, and prioritizes the second-level control over the third-level control.

Backup Control

Normal operation control of the system 100 is derived from the water quality parameters. When water quality parameter control fails, the PLC 90 will issue an alert. The fault is displayed on the output device 84 in electronic communication with the PLC 90. Further, the PLC 90 will switch to a flow metering control mode, in which flow metering parameters are derived from total water supply. However, the flow metering control mode will not be activated is the water quality parameter is caused by abnormal water quality. Instead, the PLC 90 will shut down the system 100.

EXAMPLES

Methods:

The water treatment system 100 was used to further decontaminate municipal drinking water in a number of experiments. The water treatment system 100 had the components and specifications shown in Table 1. The water quality testing equipment is listed in Table 2 where TOC is total organic carbon, TDS is total dissolved solids, TPC is total plate count of aerobic bacteria and GC is gas chromatograph. The operating parameters of the system 100 are shown in Table 3. The system ran the test according to the operating parameters set in Table 3. Experimental data collected includes detection and analysis of water quality indicators of inlet and outlet water and related charts under the condition of running drinking water equipment for 50 days.

TABLE 1

| Device Name | Specifications | Unit | Quantity |
|---|---|---|---|
| Precision ceramic filter | 20 inches long 5 micron pores | pc | 2 |
| Water pump | 1.1 kW | set | 5 |
| Primary activated carbon tank | Diameter: Φ350 Filling height: 20 cm | set | 1 |
| Activated carbon in primary tank | From coal | kg | 100 |
| Secondary activated carbon tank | Diameter: Φ350 Filling height: 20 cm | set | 1 |
| Activated carbon in secondary tank | From coconut shell and bamboo | kg | 100 |
| Other fillers in tanks | | kg | 1 |
| Water eductors | | pc | 3 |
| Water storage vessel | Volume: 1 m$^3$ Max water flow: 35 L/min | set | 1 |

TABLE 2

| Parameter | Unit | Classification | Instrument |
|---|---|---|---|
| pH | n/a | Physical and chemical indicator | pH meter |
| Temperature | ° C. | Physical and chemical indicator | Thermometer |
| UV$_{254}$ | n/a | Physical and chemical indicator | Spectrophotometer |
| TOC | mg/L | Physical and chemical indicator | TOC detector |
| TDS | mg/L | Physical and chemical indicator | TDS detector |
| Free chlorine | mg/L | Physical and chemical indicator | Hach residual chlorine detector |
| Total chlorine | mg/L | Physical and chemical indicator | Hach residual chlorine detector |
| E. coli | CFU/mL | Microbiological indicator | Incubator |
| TPC | CFU/mL | Microbiological indicator | Incubator |
| CHBrCl$_2$ | mg/L | By-product indicator | Agilent7890 GC |
| CHBr$_2$Cl | mg/L | By-product indicator | Agilent7890 GC |
| CHBr$_3$ | mg/L | By-product indicator | Agilent7890 GC |

TABLE 3

| Operating Parameter | Running Value |
|---|---|
| Ozone generator ozone production | 20 g/h |
| Maximum inflow of tap water | 18 L/min |
| Outflow of drinking water equipment | 1-5 L/min |
| Ozone generator meter temperature | 25-40° C. |

Results:

Results for the physical and chemical indicators are shown in FIG. 4 to FIG. 8 and Table 4.

Figure 4:
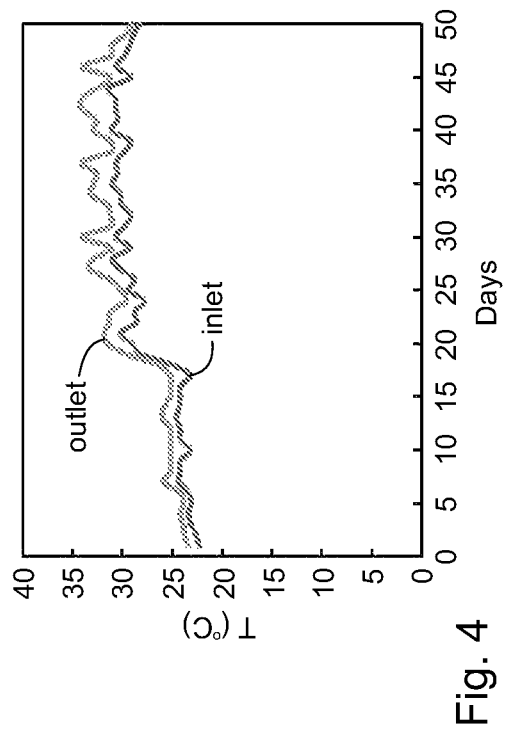
FIG. 4 is a graph of temperature (° C.) vs. operating time (days) for water at an inlet and an outlet of the water treatment system of FIG. 1.

It is apparent from FIG. 4 that the temperature of the final drinking water is slightly higher than the temperature of incoming municipal water by 1° C. Therefore, processing the municipal water in the system does not unduly affect the temperature of the water. The general increase in temperature over time reflects the onset of summer.

Figure 5:
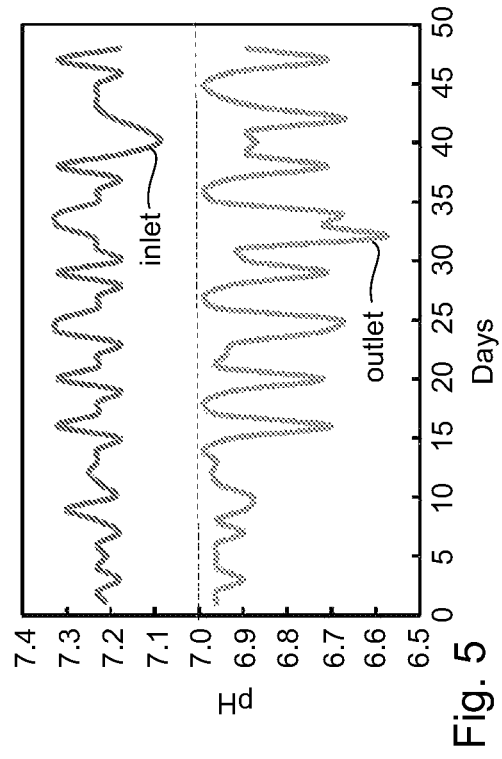
FIG. 5 is a graph of pH vs. operating time (days) for water at an inlet and an outlet of the water treatment system of FIG. 1.

It is apparent from FIG. 5 that the pH of the final drinking water is slightly lower than the pH of the incoming municipal water by a value 0.3 pH units. Further, the pH of the final drinking water has been lowered to a pH of less than 7. Therefore, processing the municipal water in the system does not unduly affect the pH of the water. Further, the pH of both the incoming municipal water and the final drinking water remains stable over time.

Figure 7:
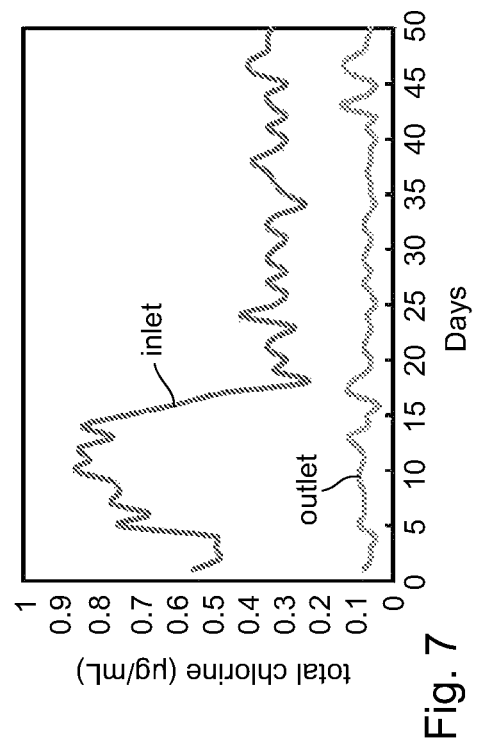
FIG. 7 is a graph of total chlorine (µg/mL) vs. operating time (days) in water at an inlet and an outlet of the water treatment system of FIG. 1.
Figure 6:
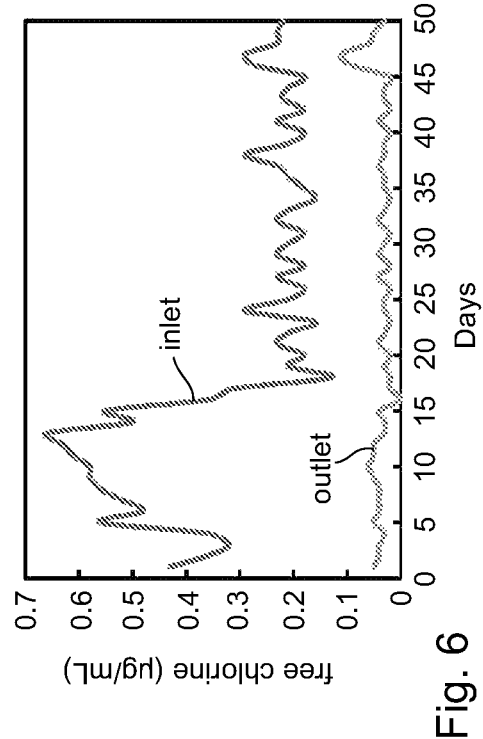
FIG. 6 is a graph of free chlorine (µg/mL) vs. operating time (days) in water at an inlet and an outlet of the water treatment system of FIG. 1.

It is apparent from FIG. 6 and FIG. 7 that free chlorine and total chlorine in the final drinking is much lower than in the incoming municipal water, by a factor of about 3 or more. Further, free chlorine in the final drinking water is always maintained at about 0.1 mg/L or less, while total chlorine is always maintained at about 0.15 mg/L. Thus, the final drinking water produced by the present system has both much lower free chlorine and total chlorine content than the municipal water, but also consistently maintains such a low value over time. The municipal water has a much higher chlorine content (both free and total), and exhibits wide variation over time.

Figure 8:
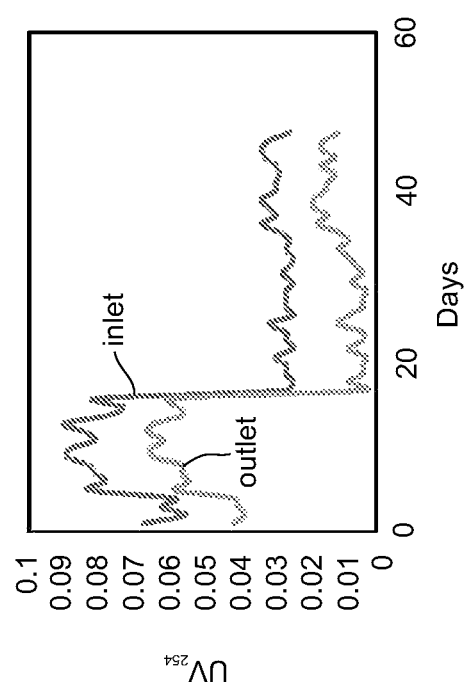
FIG. 8 is a graph of ultraviolet (UV) light absorbance at a wavelength of 254 nm vs. operating time (days) for water at an inlet and an outlet of the water treatment system of FIG. 1.

It is apparent from FIG. 8 that the $UV_{254}$ value of the final drinking water was reduced by 0.02 absorbance units compared to the incoming municipal water, indicating that the final drinking water contains less content of UV absorbing organic compounds.

It is apparent from Table 4 that the final drinking water contains slightly higher total dissolved solids (TDS) than the incoming municipal water by about 10 mg/L. Therefore, processing the municipal water in the system does not unduly affect the TDS of the water as an increase in TDS by 10 mg/L is not undue.

TABLE 4

| TDS at Inlet and Outlet | | |
|---|---|---|
| Month | Inlet | Outlet |
| May | 265-270 | 275-280 |
| June | 265-270 | 275-280 |
| July | 220-225 | 230-235 |
| August | 260-265 | 320-325 |

For microbiological indicators, *E. coli* was not detected in monthly sampling tests, and the total plate count of aerobic bacteria was about 1-2 CFU/mL in the final drinking water, which is generally acceptable.

Figure 9A:
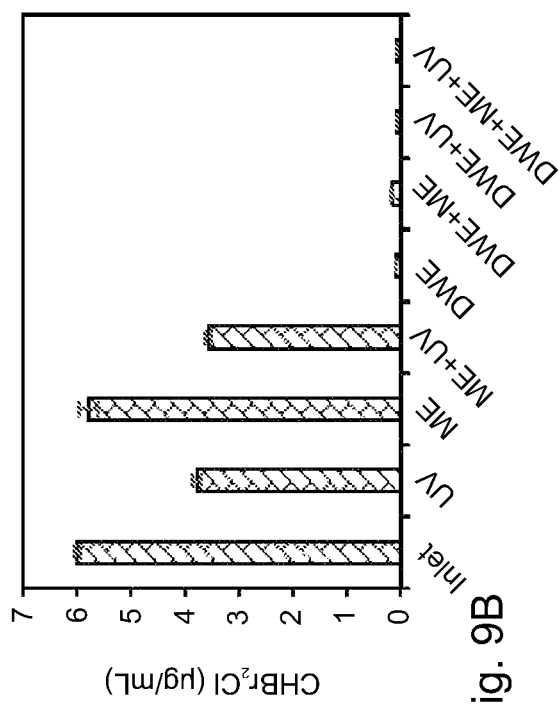
FIG. 9A depicts a graph of $CHBrCl_2$ concentration (µg/mL) for untreated water (Inlet), water treated only with ultraviolet light (UV), water treated only with magnetization equipment (ME), water treated only with both ultraviolet light and magnetization equipment (ME+UV), water treated with the system of FIG. 1 (DWE), water treated with the system of FIG. 1 followed by treatment with magnetization equipment (DWE+ME), water treated with the system of FIG. 1 followed by treatment with ultraviolet light (DWE+UV), and water treated with the system of FIG. 1 followed by treatment with both magnetization equipment and ultraviolet light (DWE+ME+UV)
Figure 9B:
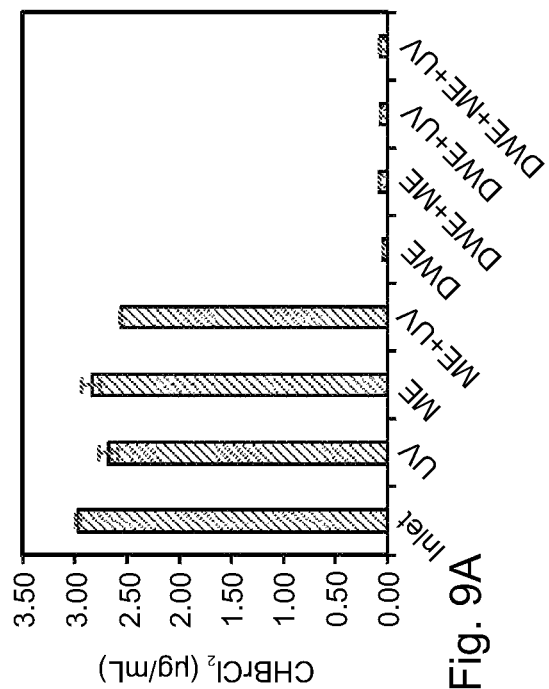
FIG. 9B depicts a graph of $CHBr_2Cl$ concentration (µg/mL) for untreated water (Inlet), water treated only with ultraviolet light (UV), water treated only with magnetization equipment (ME), water treated only with both ultraviolet light and magnetization equipment (ME+UV), water treated with the system of FIG. 1 (DWE), water treated with the system of FIG. 1 followed by treatment with magnetization equipment (DWE+ME), water treated with the system of FIG. 1 followed by treatment with ultraviolet light (DWE+UV), and water treated with the system of FIG. 1 followed by treatment with both magnetization equipment and ultraviolet light (DWE+ME+UV); and, FIG. 9C depicts a graph of $CHBr_3$ concentration (µg/mL) for untreated water (Inlet), water treated only with ultraviolet light (UV), water treated only with magnetization equipment (ME), water treated only with both ultraviolet light and magnetization equipment (ME+UV), water treated with the system of FIG. 1 (DWE), water treated with the system of FIG. 1 followed by treatment with magnetization equipment (DWE+ME), water treated with the system of FIG. 1 followed by treatment with ultraviolet light (DWE+UV), and water treated with the system of FIG. 1 followed by treatment with both magnetization equipment and ultraviolet light (DWE+ME+UV).
Figure 9C:
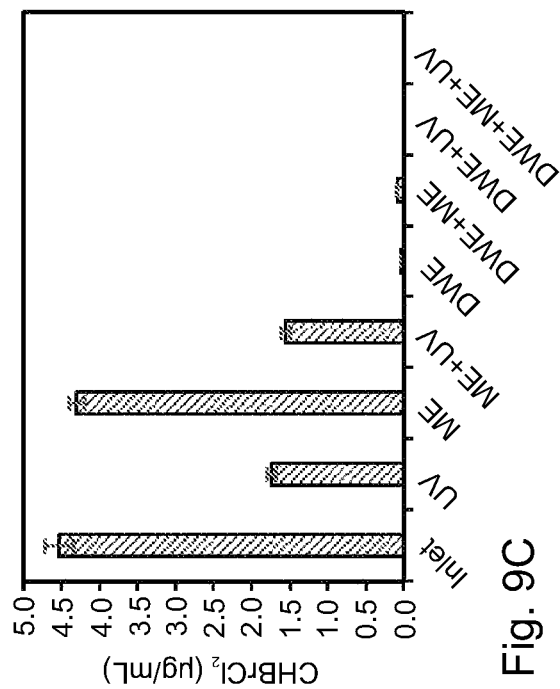

Results for disinfection by-product indicators (DBPs) are shown in FIG. 9A to FIG. 9C and Table 5. When testing the indicators of disinfection by-products in the drinking water equipment (DWE), ultraviolet (UV) and magnetization equipment (ME) were also tested in parallel for comparative analysis. It is apparent from FIG. 9A, FIG. 9B and FIG. 9C that DBP content in the water is dramatically reduced by the present system in comparison to the municipal water, to water treated by either UV or ME alone, and to water treated successively by ME and UV. The effect of the present water treatment system on DBPs is very significant, being able to reduce the concentration of $CHBrCl_2$, $CHBr_2Cl$ and $CHBr_3$ by 98% or more, as seen in Table 5.

TABLE 5

| DBP Content at Inlet and Outlet | | | |
|---|---|---|---|
| Month | $CHBrCl_2$ | $CHBr_2Cl$ | $CHBr_3$ |
| Inlet | 2.98 | 6 | 4.53 |
| Outlet | 0.05 | 0.09 | 0.04 |
| Reduction Value | 98.30% | 98.50% | 99.10% |

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A water treatment system comprising:
a system inlet arrangeable in fluid communication with a source of water to be treated and so as to admit process water to the water treatment system, the system inlet in fluid communication with a plurality of water lines for transporting the process water through the system along a flow path where the process water flows through a first activated carbon filter,
a second activated carbon filter downstream of the first activated carbon filter,
a particulate filter downstream of the second activated carbon filter, and
a first UV sterilizer downstream of the particulate filter;
a water storage vessel at an end of the flow path for storing water produced by the system;
an ozone subsystem comprising an ozonator for making ozone and at least one junction along the flow path for introducing the ozone into the process water, wherein the ozone subsystem is configured to withdraw water from the water storage vessel and add ozone to the withdrawn water to form ozonated water, and wherein the ozone subsystem is configured to introduce the ozonated water to the process water through a first branch water line connected to the flow path at a first junction located between the second activated carbon filter and the first UV sterilizer and upstream or downstream of the particulate filter, through a second branch water line connected to the flow path at a second junction located between the first activated carbon filter and the second activated carbon filter, and through a third branch water line connected to the flow path at a third junction located upstream of the first activated carbon filter;
a system outlet in fluid communication with the water storage vessel for delivering the water from the water storage vessel to a location outside the water treatment system;
a recycle subsystem that is periodically operable to withdraw water from the water storage vessel to form recycled water, introduce the recycled water to the water lines upstream of the UV sterilizer, and return the recycled water to the water storage vessel; and, a main programmable logic controller (PLC) for controlling a flow of the process water through the water treatment system and for controlling the recycle subsystem.

2. The water treatment system of claim 1, wherein the ozone subsystem comprises a first eductor in the first branch water line, a second eductor in the second branch water line, and a third eductor in the third branch water line and wherein the first eductor, the second eductor and the third eductor introduce the ozone to the water from the water storage vessel to form the ozonated water in the first branch water line, the second branch water line and the third branch water line.

3. The water treatment system of claim 2, wherein the ozone subsystem further comprises a first UV oxidizer in the first branch water line downstream of the first eductor, a second UV oxidizer in the second branch water line downstream of the second eductor, and a third UV oxidizer in the third branch water line downstream of the third eductor.

4. The water treatment system of claim 1, wherein the process water contains ozone in a range of from 0.05 to 2 ppm.

5. The water treatment system of claim 1, further comprising a water quality analyzer for measuring at least one water quality parameter of the process water, the water quality analyzer in electronic communication with the main programmable logic controller, the main programmable logic controller programmed to compare the at least one water quality parameter measured by the at least one sensor to an index value of the at least one water quality parameter and to operate the water treatment system based on the comparison.

6. The water treatment system of claim 5, wherein the at least one water quality parameter comprises one or more of residual chlorine, total chlorine, total organic carbon, total dissolved solids, pH, conductivity and temperature.

7. The water treatment system of claim 6, wherein the at least one water quality parameter comprises a plurality of water quality parameters.

8. The water treatment system of claim 5, wherein the main programmable logic controller comprises or is in communication with an ozone controller that controls an amount of ozone injected into the process water based on the comparison.

9. The water treatment system of claim 8, wherein the system comprises an in-line ozone detector that measures an ozone concentration and wherein the ozone controller controls an amount of ozone introduced into the process water based on the ozone concentration.

10. The water treatment system of claim 1, wherein the recycle subsystem is automatically operable on a periodic time basis.

11. The water treatment system of claim 1, wherein the first UV sterilizer is operable when the recycle subsystem is operable.

12. The water treatment system of claim 1, wherein the water storage vessel is a variable-volume water storage vessel comprising at least one water level sensor that signals a shutdown of a flow of the process water into the system when water level in the vessel is at or exceeds a first predetermined water level and signals a switch on of the flow of process water into the system when the water level in the vessel is at or lower than a second predetermined water level lower than the first predetermined water level.

13. The water treatment system of claim 1, wherein the system further comprises a water holding tank between the system inlet and the first activated carbon filter, and wherein the water holding tank is a variable-volume water storage vessel comprising at least one water level sensor that signals a shutdown of a flow of the process water into the system when water level in the vessel is at or exceeds a first predetermined water level and signals a switch on of the flow of the process water into the system when the water level in the vessel is at or lower than a second predetermined water level lower than the first predetermined water level.

14. The water treatment system of claim 1, wherein the second activated carbon filter contains bamboo-derived activated carbon and/or coconut-derived activated carbon.

15. The water treatment system of claim 1, wherein the particulate filter comprises a ceramic microfiltration membrane or a ceramic ultrafiltration membrane.

16. The water treatment system of claim 1, further comprising a second UV sterilizer between the water storage vessel and the system outlet.

* * * * *